United States Patent [19]

Rautiola

[11] Patent Number: 5,666,656
[45] Date of Patent: Sep. 9, 1997

[54] SELECTING WHICH MAIN BASE STATION FOR AN INFILL BASE STATION TO MONITOR IN A MOBILE RADIO SYSTEM

[75] Inventor: Markku Rautiola, Tampere, Finland

[73] Assignee: Nokia Telecommunications Oy, Espoo, Finland

[21] Appl. No.: 448,356
[22] PCT Filed: Sep. 2, 1994
[86] PCT No.: PCT/FI94/00389
   § 371 Date: May 2, 1995
   § 102(e) Date: May 2, 1995
[87] PCT Pub. No.: WO95/07011
   PCT Pub. Date: Mar. 9, 1995

[30] Foreign Application Priority Data

Sep. 3, 1993 [FI] Finland ................ 933864

[51] Int. Cl.$^6$ ................ H04Q 7/00; H04Q 9/00
[52] U.S. Cl. .............. 455/513; 455/67.1; 455/515; 455/525; 455/434
[58] Field of Search .................. 455/33.1, 33.4, 455/34.1, 34.2, 54.1, 56.1, 62, 67.1

[56] References Cited

U.S. PATENT DOCUMENTS

| | | |
|---|---|---|
| 5,319,796 | 6/1994 | Grube et al. |
| 5,327,574 | 7/1994 | Monma et al. ............... 455/56.1 |
| 5,437,056 | 7/1995 | Rautiola ............... 455/56.1 |
| 5,493,286 | 2/1996 | Grube et al. ............... 455/33.4 |
| 5,535,423 | 7/1996 | Dupuy ............... 455/56.1 |
| 5,548,807 | 8/1996 | Ueda ............... 455/56.1 |

FOREIGN PATENT DOCUMENTS

| | | | |
|---|---|---|---|
| 3-167924 | 7/1991 | Japan | ............... 455/34.1 |
| 9308655 | 4/1993 | WIPO . | |
| 9312589 | 6/1993 | WIPO . | |

*Primary Examiner*—Reinhard J. Eisenzopf
*Assistant Examiner*—Sam Bhattacharya
*Attorney, Agent, or Firm*—Cushman Darby & Cushman Intellectual Property Group of Pillsbury Madison & Sutro LLP

[57] ABSTRACT

A method for selecting a channel and a base station in a mobile radio system, the geographical coverage area of which is divided into radio cells, each radio cell including a main base station indicated by an identifier, and at least one of the radio cells including at least one infill base station. In the method, the main base station signals with subscriber stations on a control channel having a downlink frequency for signalling from a base station to a subscriber station and an uplink frequency for signalling from a subscriber station to a base station. Each infill base station monitors the subscriber stations at the uplink frequency of the control channel of the respective main base station. To select the best possible main base station, each infill base station measures the quality of the control channels of predetermined ones of the main base stations and selects, on the basis of the quality of the downlink frequencies of the control channels, a main base station the uplink frequency of the control channel of which it begins to monitor.

11 Claims, 1 Drawing Sheet

SELECTING WHICH MAIN BASE STATION FOR AN INFILL BASE STATION TO MONITOR IN A MOBILE RADIO SYSTEM

FIELD OF THE INVENTION

The invention relates to a method for selecting a channel in a mobile radio system, the geographical coverage area of which is divided into radio cells, each radio cell comprising a main base station indicated by an identifier and at least one radio cell comprising at least one infill base station, in which method the main base station signals with subscriber stations on a control channel having a downlink frequency for signalling from a base station to a subscriber station and an uplink frequency for signalling from a subscriber station to a base station, and an infill base station monitors the subscriber stations at the uplink frequency of the control channel of the main base station.

The invention may be applied for instance to trunking networks, i.e. divided radio networks, being private radio networks, which offer by means of common use of radio channels several user groups the functions and services of a private radio network used by one organization.

However, the invention may be applied equally well also to conventional cellular mobile radio systems, e.g. mobile telephone systems.

The invention is suitable for being used in mobile radio systems having a digital radio path as well as in those having an analog radio path. Analog mobile radio systems have been described for instance in the following publications of the British Department of Trade and Industry: "MPT 1327, January 1988, Revised and reprinted November 1991, A Signalling Standard for Trunked Private Land Mobile Radio Systems, Radiocommunications Agency" and "MPT 1343, January 1988, Revised and reprinted September 1991, Performance Specification, Radiocommunications Agency".

BACKGROUND OF THE INVENTION

It is known in connection with mobile radio systems that, besides a main base station, also one or several additional base stations, i.e. infill base stations, may be positioned in one radio cell. An infill base station may be separate or it may be based on using an antenna and/or transceiver units of the main base station. It is reasonable to use infill base stations when frequency allocation plans and schemes and shortage of frequency range make it necessary to reuse the same traffic channel in the cells of a mobile radio system, such as a cellular radio system, at shorter distance than would be done according to normal frequency allocation plans. The infill base stations have smaller coverage areas, because the traffic between them and subscriber stations use in both directions lower radio powers than the normal main or mother base stations do.

Those traffic channel units of one infill base station or the main base station which are allocated to be used by infill base stations can use a group of infill base station channels. The channels of an infill base station are conventionally configurated in such a way that the infill base stations use the control channel of the main base station. The infill base stations thus monitor signalling of subscriber stations occurring on the control channel of the main base station. Then the subscriber stations, i.e. radio telephones, desiring a connection with the network, contact on the control channel of the main base station an infill base station, which transmits a request for establishing a connection to an exchange of the mobile radio system. The exchange then allocates some suitable traffic channel of the additional, i.e. infill base station for the traffic between the subscriber station and the infill base station, and a command to move onto this traffic channel is transmitted to the infill base station, which starts monitoring that traffic channel.

A problem with allocating a traffic channel according to the prior art is that, when the exchange of the mobile radio system tells an infill base station to start monitoring the traffic occurring on a predetermined control channel, the infill base station actually starts monitoring this control channel and searches for signalling of subscriber stations on that channel. An attentive reader notices that, in a case according to the prior art, the infill base station itself does not send any signalling to the main base station on the control channel. If now that the infill base station monitors the control channel of the predetermined main base station, that main base station stops functioning abruptly, for instance if its transceiver is damaged, all subscriber stations, i.e. radio telephones, within the coverage area of that main base station begin, after a process of searching for a control channel, to monitor the control channels of the other main base stations located adjacent to the main base station mentioned above. Then the infill base stations within the coverage area of said main base station are left monitoring the "idle" control channel, on which the subscriber stations do not signal any longer. The infill base station is then entirely worthless and of no use.

SUMMARY OF THE INVENTION

An object of this invention is to offer an infill base station of a radio system a possibility of avoiding the above described appearing in the prior art. Another object of the invention is to give an infill base station a possibility of selecting freely on the control channel of which main base station the signalling occurs that the infill base station begins to monitor. The base station to be monitored may be selected from among allowed base stations only and the control channel to be selected may be chosen on the basis of how good message quality that channel has.

This novel channel selection method is provided by means of a method according to the invention, which is characterized in that the infill base station measures the quality of the control channels of the predetermined main base stations and selects, on the basis of the quality of the downlink frequencies of the control channels, the main base station the uplink frequency of the control channel of which it begins to monitor.

A further object of the invention is a base station of a mobile radio system to be used as an infill base station, comprising: a radio transceiver and a controller unit for controlling the base station. This base station is characterized in that the controller unit further comprises means for measuring the quality of the control channels of the predetermined base stations and for selecting, on the basis of the quality of the downlink frequencies of the control channels, the base station the uplink frequency of the control channel of which the base station begins to monitor.

The invention is based on the idea that an infill base station measures the traffic of subscriber stations on the control channels of allowed main base stations and selects, on the basis of the quality of downlink signalling on the control channel occurring from a main base station to a subscriber station, the main base station the uplink signalling on the control channel of which, occurring from a subscriber station to a base station, the infill base station begins to monitor.

An advantage of such a channel selection method is that the invention avoids the problem caused by a situation due to a damaged or "fallen" mother base station, i.e. main base station, when additional, i.e. infill base stations monitor a control channel on which no subscriber station is signalling.

Another advantage of the invention is that it secures the operation of the system, because infill base stations are, according to the invention, capable of selecting independently a main base station suitable for themselves, the control channel of which they monitor. This is an important property in case the configuration of the mobile radio system changes abruptly, e.g. if some base stations are damaged.

BRIEF DESCRIPTION OF THE DRAWINGS

In the following, the invention will be described in more detail with reference to the attached drawing, in which.

DETAILED DESCRIPTION OF PREFERRED EMBODIMENT OF THE INVENTION

Figure 1:
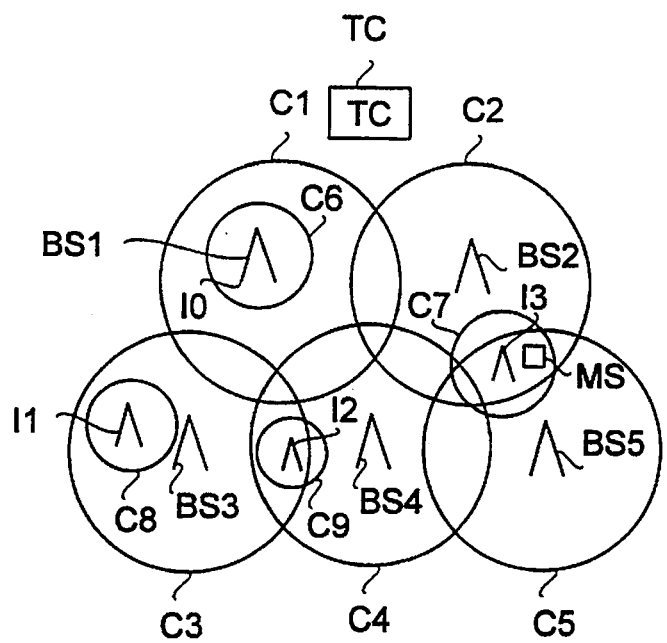
FIG. 1 shows a diagrammatic plan of cells of a mobile radio system and base stations thereof.

FIG. 1 shows a diagrammatic plan of cells of a mobile radio system and base stations thereof. The Figure shows a subscriber station MS, an exchange TC of the mobile radio system and five base stations BS1, BS2, BS3, BS4 and BS5, the coverage areas of which are C1, C2, C3, C4 and C5, respectively. The Figure shows additionally infill base stations I0, I1, I2 and I3, each of them having separate coverage areas C6, C7, C8 and C9 which are smaller than the coverage areas of the main base stations. From the Figure is seen that the infill base stations are positioned in such a Way that they are either at the same location as respective ones of the main base station BS1, or apart from the main base stations BS-2-BS5. The coverage areas of the infill base stations may overlap the coverage area of only one main base station entirely, such as the infill base stations I0 and I1 and their respective coverage areas C6 and C8. On the other hand, the coverage areas of the infill base stations may overlap the coverage areas of two or even several main base stations. This is the case with the infill base station I2, the coverage area of which overlaps the respective coverage areas C3 and C4 of the main base stations BS3 and BS4. Further, the coverage area C7 of the infill base station I3 overlaps the respective coverage areas C2, C4 and C5 of the main base stations BS2, BS4 and BS5.

From the point of view of the invention, those cases are of interest in which the coverage area of an infill base station overlaps the coverage areas of more than one main base station. In FIG. 1, such infill base stations are I2 and I3. In these cases when the coverage area of an infill base station overlaps the coverage area of more than one main base station, it is preferable according to the invention, if the infill base station can be used, when required, for assisting all those main base stations the coverage areas of which overlap the coverage area of the infill base station. To make an infill base station assist a predetermined main base station, when required, is caused as follows. The data base of the infill base station comprises an information of those main base stations the infill base station is allowed to assist. The infill base station does not monitor fixedly the control channel of a main base station, and especially the uplink frequency of the control channel, i.e. the frequency of the traffic occurring from a subscriber station to the base station, as is the case in the solutions according to the prior art, but the infill base station operates as follows. At starting or at suitable intervals, the infill base station searches in its data base for the identifiers of the allowed main base stations and for the control channels used by them. Subsequently, the infill base station is tuned to the downlink frequency of the control channel of each main base station in turn, i.e. to the frequency from a base station to a subscriber station, and measures at that frequency message quality of the main base station, e.g. message reception power and bit error rate of the message, and performs other message quality measurements. The infill base station may store the results of this measurement in its memory and then perform the same measurements of a message sent at the downlink frequency of the control channel of some other allowed main base station. Upon measuring messages of all allowed main base stations, the infill base station selects on the basis of these measurement results the base station which has the best message quality. This takes place because it is presumable that the subscriber stations contacting that main base station also have the best message quality, since the message of the main base station is best at that infill base station. Accordingly, the infill base station selects in this invention dynamically the main base station the control channel of which it begins to monitor. These measurements performed by the infill base station can be repeated at desired intervals and also with other criteria, e.g. if there is not enough traffic in the base station otherwise, i.e. there is capacity left to perform necessary measurements. Subsequently, upon selecting a predetermined main base station for monitoring, the infill base station informs the exchange of the mobile radio system of the base station the control channel of which it begins to monitor.

According to the invention, an infill base station may also compare an identifier of a main base station included in a message received from the main base station with identifiers of the allowed main base stations contained in its own data base. As a result of the comparison, if the identifier included in the message sage is allowed, the infill base station accepts the respective main base station for measuring, and upon measuring, the infill base station selects in the manner described in the preceding paragraph the main base station the uplink frequency of the control channel of which it begins to monitor.

In case the above procedure of selecting a control channel and a main base station has been carried out, the operation of an infill base station is as follows. According to the above description, the infill base station has moved to monitor the uplink frequency of the control channel of a main base station, i.e. messages sent by subscriber stations. Upon receiving from a subscriber station a request for establishing a connection, the infill base station transmits this request to the exchange TC of the mobile radio system. The exchange selects from its data base a free traffic channel for the traffic between the respective subscriber station and the infill base station and sends a command concerning this to the infill base station. Upon receiving that command, the infill base station moves onto the traffic channel desired by the exchange and begins to establish a connection with the respective said subscriber station.

Figure 2:
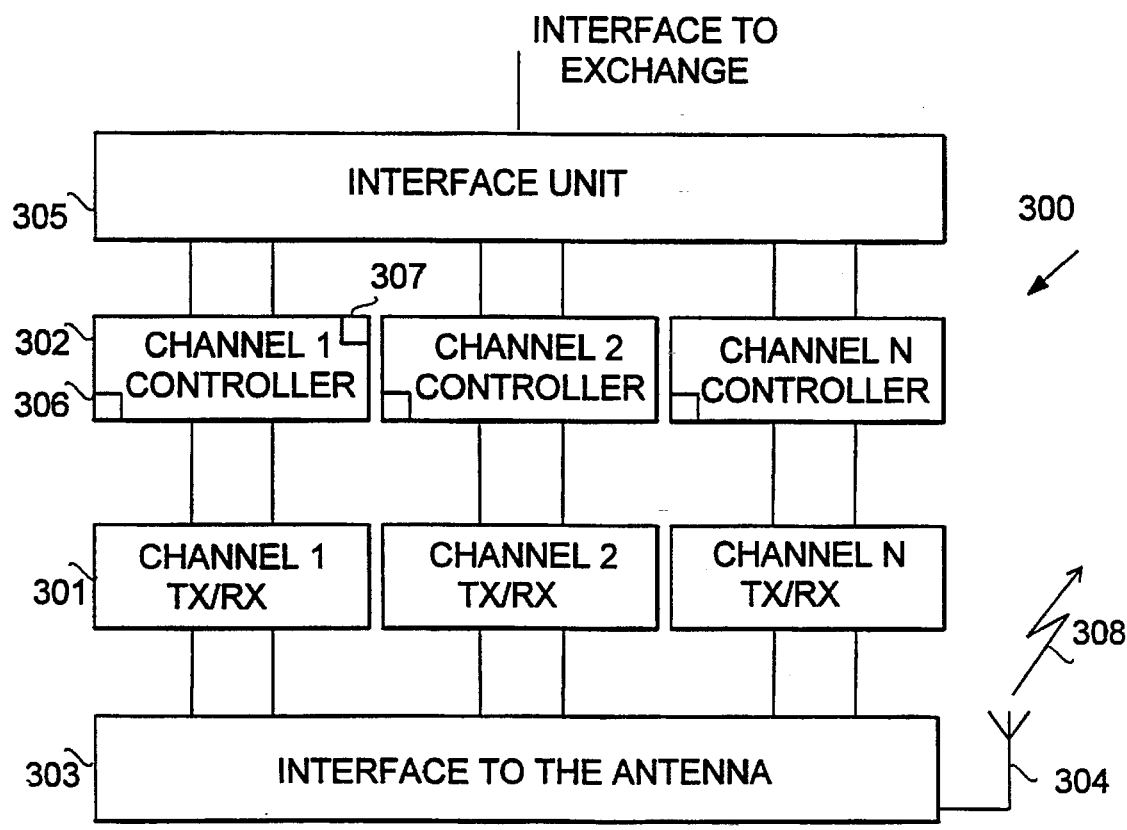
FIG. 2 shows a block diagram of the structure of an infill base station.

FIG. 2 shows the structure of an infill base station. The base station may have one channel or several channels. A radio channel may be a time-division channel, whereby one radio channel may have several ongoing calls or signalling connections simultaneously, or alternatively, there is a dedicated radio channel for each speech or signalling connection.

Each radio channel is associated with a transceiver unit TX/RX 301 and a controller 302. An antenna connection 303 comprises circuits for connecting and fitting radio channels to an antenna 304, from which a radio signal is sent to a radio path 308.

The base station is associated with the exchange TC, which is shown in FIG. 1 through an interface unit 305. For the sake of clarity, FIG. 1 does not show the existing transmission connections between the exchange and the base stations. This connection is typically digital, and several speech or signalling channels are multiplexed to the same connection.

The channel-specific controller 302 comprises, in addition to the other functions, means 306 for measuring the quality of the control channels of predetermined base stations and for selecting, on the basis of the quality of the downlink frequencies of the control channels, the base station the uplink frequency of the control channel of which the base station begins to monitor. Suitable measuring devices exist for the measurements and the comparison operation may be performed by a suitable software program.

The channel-specific controller 302 of the base station of the invention to be used as an infill base station comprises, besides the above described elements, a data base 307, in which are stored the identifiers of those base stations with which the base station is allowed to establish a connection. The infill base station is capable of reading from this data base the identifiers and respective control channels of those base stations the infill base station in question is allowed to begin to monitor.

The drawings and the specification associated therewith are only intended to illustrate the idea of the invention. As to the details, the method for selecting a channel in a mobile radio system and a base station in a mobile radio system according to the invention may vary within the scope of the claims. Though the invention has been described above in connection with trunking networks in the first place, the invention may also be used in mobile radio networks of other kinds, e.g. in a GSM system or in other mobile telephone networks.

I claim:

1. A method for selecting a channel in a mobile radio system, the geographical coverage area of which is divided into a plurality of radio cells, each radio cell comprising a main base station indicated by an identifier, at least one said radio cell further comprising at least one infill base station, said method comprising the steps of:

(a) signalling by each said main base station with subscriber stations on a respective control channel having a respective downlink frequency for signalling from the respective base stations to subscriber stations and a respective uplink frequency for signalling from each respective subscriber station to a respective said base stations, (b) monitoring by a said infill base station respective of the subscriber stations at the uplink frequency of the control channel of a respective said main base station, (c) measuring by the respective infill base station the quality of the downlink control channels of predetermined ones of said main base stations, and (d) selecting by the respective infill base station on the basis of the quality of the downlink frequencies of said downlink control channels, a one of said main base stations the uplink frequency of the control channel of which main base station the respective infill base station begins to monitor in continuation of or in place of the one being monitored in step (b).

2. The method for selecting a channel according to claim 1, wherein:

step (c) further includes searching by said infill base station in a data base thereof for the identifiers of said predetermined main base stations and for the control channels used by said predetermined main base stations, step (c) further includes tuning by said infill base station of itself to monitor the downlink frequencies of the control channels of said predetermined main base stations in turn, step (c) further includes measuring by said infill base station of the quality of each message received at the respective downlink frequency of the respective said control channels, step (d) further includes selecting by said infill base station for monitoring the respective said main base station which has the best message quality, step (d) further includes informing by said infill base station an exchange of said mobile radio system that said infill base station is beginning to monitor the uplink frequency of said control channel of the selected said main base station, and step (d) further includes beginning by said infill base station to monitor the uplink frequency of the respective said control channel of said selected main base station.

3. The method for selecting a channel according to claim 2, wherein:

step (c) further includes discovering by said infill base station, when being tuned to monitor the downlink frequencies of the control channels of respective of said main base stations, at said frequencies, an identifier sent by a main base station, step (c) further includes comparing by said infill base station of said discovered identifier with the identifiers of said predetermined main base stations in said data base thereof, and step (c) further includes said infill base station performing as a result of the comparison, if said identifier is of one of said predetermined main base stations, measurements of message quality, and step (d) further includes informing by said infill base station said exchange of said mobile radio system of the identifier of said selected main base station.

4. The method for selecting a channel according to claim 2, further comprising:

said infill base station receiving from a subscriber station a request for establishing a connection, said infill base station transmitting information as to said request for establishing a connection, received from said subscriber station, to said exchange of said mobile radio system, said exchange selecting from a data base of said exchange a free traffic channel for the traffic between said subscriber station from which said request was received and said infill base station, said infill base station receiving from said exchange a command to move onto said traffic channel in the traffic with said subscriber station, and said infill base station moving onto said traffic channel.

5. The method for selecting a channel according to claim 3, further comprising:

said infill base station receiving from a subscriber station a request for establishing a connection, said infill base station transmitting information as to said request for establishing a connection, received from said subscriber station, to said exchange of said mobile radio system, said exchange selecting from a data base of said exchange a free traffic channel for the traffic between said subscriber station from which said request was received and said infill base station, said infill base station receiving from said exchange a command to move onto said traffic channel in the traffic with said subscriber station, and said infill base station moving onto said traffic channel.

6. The channel management method according to claim 2, wherein:

in practicing step (c), in case the quality of a message received at the downlink frequency of a respective said control channel is not sufficient, said infill base station tuning to monitor the control channel of the main base station of some other said radio cell and thereby searching for a best possible control channel for selection in step (d).

7. The channel management method according to claim 3, wherein:

in practicing step (c), in case the quality of a message received at the downlink frequency of a respective said control channel is not sufficient, said infill base station tuning to monitor the control channel of the main base station of some other said radio cell and thereby searching for a best possible control channel for selection in step (d).

8. The channel management method according to claim 4, wherein:

in practicing step (c), in case the quality of a message received at the downlink frequency of a respective said control channel is not sufficient, said infill base station tuning to monitor the control channel of the main base station of some other said radio cell and thereby searching for a best possible control channel for selection in step (d).

9. The channel management method according to claim 5, wherein:

in practicing step (c) in case the quality of a message received at the downlink frequency of a respective said control channel is not sufficient, said infill base station tuning to monitor the control channel of the main base station of some other said radio cell and thereby searching for a best possible control channel for selection in step (d).

10. An infill base station of a mobile radio system, comprising:

a radio transceiver, a controller unit for controlling said infill base station, comprising means for measuring the quality of the control channels of a plurality of predetermined main base stations of said mobile radio system and for selecting, on the basis of the quality of the downlink frequencies of the control channels, the main base station the uplink frequency of the control channel of which the base station begins to monitor.

11. The infill base station according to claim 10, further comprising:

a data base storing identifiers of said predetermined main base stations with which said infill base station is allowed to establish a connection of monitoring.

* * * * *